Figure 1:
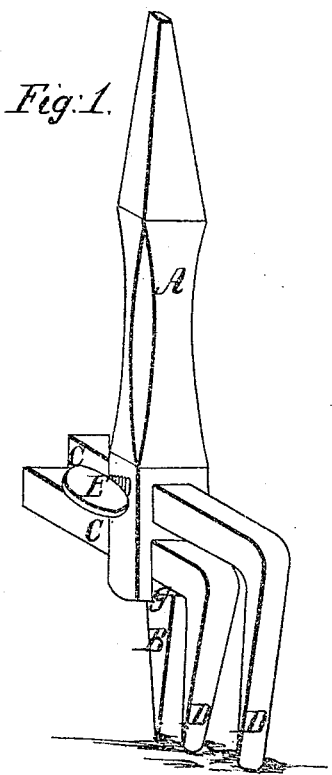
Figure 2:
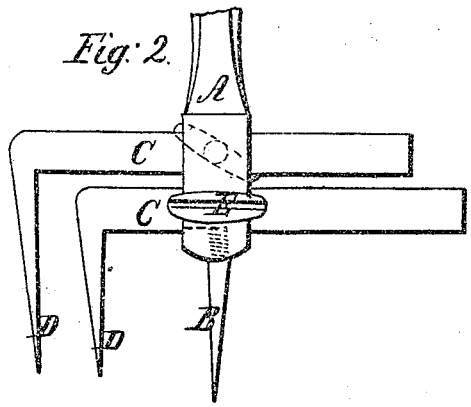

H. PENNIE.
ADJUSTABLE BIT FOR CUTTING WASHERS.

No. 25,348. Patented Sept. 6, 1859

Witnesses;
W. H. Forbush
B. Forbush

Inventor;
Henry Pennie

UNITED STATES PATENT OFFICE.

HENRY PENNIE, OF BUFFALO, NEW YORK.

BIT FOR CUTTING WASHERS.

Specification of Letters Patent No. 25,348, dated September 6, 1859.

*To all whom it may concern:*

Be it known that I, HENRY PENNIE, of the city of Buffalo, in the county of Erie and State of New York, have invented a certain new and Improved Adjustable Bit for Cutting Washers; and I do hereby declare that the following is a full, clear, and exact description of the same, reference being had to the accompanying drawings and the letters of reference marked thereon, making a part of this specification, in which—

Figure I, is a perspective view, and Fig. II, is a side elevation.

Like letters refer to like parts in each of the figures.

A, is a shank constructed so as to fit in a common carpenter's brace. A center point or pin (B) is screwed into the shank at the opposite end from that which fits into the brace. Its object is to form a center, from which the cutters act. Two mortises are made in the shank (A) to receive the shanks of the sliding cutters.

C and C, are sliding cutter shanks. They consist of two horizontal bars or shanks placed one above the other which slide through the mortises in the shank, (A). Steel cutters (D) are welded to these bars or shanks at right angles to them and parallel to the center pin (B). The cutters may be regulated so as to cut any desired size or width of washer, by sliding either or both of them in the shank, and when in the desired position holding them by means of the thumb set screws (E). By removing one of the cutters and securing the other at the proper place the instrument may be used for cutting circles &c. The thumb set screws should be placed on opposite sides of the shank (A).

It is necessary to make the center point (B) enough longer, than the cutters, to allow it to take hold in the material from which the washers are being cut before the strain of cutting comes upon it. It is also necessary to make the inner cutter longer than the outer one, so that the inner circle of the washer will be cut first. If the outer circle was cut first, it would be necessary to fasten or hold the washer while the inner circle was being cut; otherwise; the inner cutter would carry the washer around with it, instead of cutting it, but if the inner circle be cut first the main body of the material will afford means of holding the washer while the outer circle is being cut.

A recess ($g$,) is made in the lower end of the shank (A) to allow the inner cutter to slide up close to the point (B) and by that means adapt the instrument to cutting very small washers for gas fitting &c.

This invention is applicable to cutting washers from leather, gutta percha, pasteboard, paper, or materials of a similar nature. It is a very useful instrument for the purpose intended.

I claim—

1. The arrangement of the cutters D and D upon the ends of the sliding bars C and C and at right angles thereto—the said sliding bars passing through a mortise in the shank (A) and lying parallel with each other, and one above the other, so that the cutters will come upon the same side of the center point B substantially as described.

2. I claim the recess ($g$) made in the lower end of the shank (A) so as to allow the inner cutter to slide close up to the point (B) and thereby adapt the instrument to cutting very small washers, as set forth.

HENRY PENNIE.

Witnesses:
W. H. FORBUSH,
E. B. FORBUSH.